US008855909B2

(12) United States Patent
Bauer (10) Patent No.: US 8,855,909 B2
(45) Date of Patent: Oct. 7, 2014

(54) ROUTE DETERMINING SYSTEM FOR A VEHICLE WITH NAVIGATION SYSTEM

(75) Inventor: Lee Bauer, Grosse Pointe Farms, MI (US)

(73) Assignee: Harman International Industries, Inc., Northridge, CA (US)

( * ) Notice: Subject to any disclaimer, the term of this patent is extended or adjusted under 35 U.S.C. 154(b) by 1227 days.

(21) Appl. No.: 12/350,085

(22) Filed: Jan. 7, 2009

(65) Prior Publication Data

US 2009/0248285 A1  Oct. 1, 2009

(51) Int. Cl.
G01C 21/36 (2006.01)
G06F 17/30 (2006.01)
G08G 1/0968 (2006.01)

(52) U.S. Cl.
CPC .... *G08G 1/096816* (2013.01); *G06F 17/30241* (2013.01); *G01C 21/362* (2013.01); *G08G 1/096844* (2013.01); *G08G 1/096838* (2013.01); *G08G 1/096894* (2013.01)
USPC ......................................... 701/210; 701/117

(58) Field of Classification Search
CPC ............... G01C 21/343; G06Q 10/047; G08G 1/096716
USPC ..................... 701/1, 201, 209, 210
See application file for complete search history.

(56) References Cited

U.S. PATENT DOCUMENTS

| | | |
|---|---|---|
| 5,790,974 A | 8/1998 | Tognazzini |
| 6,466,865 B1 | 10/2002 | Petzold |
| 6,898,569 B1 | 5/2005 | Bansal et al. |
| 7,546,201 B2 * | 6/2009 | Lee et al. ....................... 701/117 |
| 7,627,423 B2 * | 12/2009 | Brooks ........................... 701/433 |
| 8,204,686 B2 * | 6/2012 | Jung et al. ..................... 701/516 |
| 8,457,890 B2 * | 6/2013 | Ros .............................. 701/489 |
| 2002/0030698 A1 | 3/2002 | Baur et al. |
| 2002/0082771 A1 * | 6/2002 | Anderson .................... 701/209 |
| 2003/0004776 A1 | 1/2003 | Perrella et al. |
| 2003/0204290 A1 * | 10/2003 | Sadler et al. ..................... 701/1 |
| 2005/0027442 A1 | 2/2005 | Kelley et al. |
| 2006/0089787 A1 * | 4/2006 | Burr et al. ..................... 701/202 |
| 2006/0155465 A1 * | 7/2006 | Jung et al. ..................... 701/209 |
| 2009/0106036 A1 * | 4/2009 | Tamura et al. ..................... 705/1 |
| 2009/0240427 A1 * | 9/2009 | Siereveld et al. ............. 701/201 |

FOREIGN PATENT DOCUMENTS

| | | |
|---|---|---|
| EP | 0 795 835 A1 | 9/1997 |
| EP | 1172631 A1 | 1/2002 |
| WO | WO 03/107129 A1 | 12/2003 |

* cited by examiner

*Primary Examiner* — Hiep V Nguyen
*Assistant Examiner* — Teresa Woods
(74) *Attorney, Agent, or Firm* — O'Shea Getz P.C.

(57) ABSTRACT

A system for determining an optimum route to a destination by a navigation system of a vehicle is provided. The system includes a navigation system, a remote information system, and a data communication network linking the navigation system and the remote information system. A method is also disclosed that includes the steps of establishing a communication connection between the navigation system and the remote information system, and determining the optimum route to the destination where the optimum route is determined based on requested information received from the remote information system.

31 Claims, 4 Drawing Sheets

ROUTE DETERMINING SYSTEM FOR A VEHICLE WITH NAVIGATION SYSTEM

RELATED APPLICATION

This application claims priority under 35 U.S.C. §119(a) of European Patent Application Serial Number 08 000 167.0, filed on Jan. 7, 2008, entitled "METHOD FOR CALCULATING A ROUTE TO A DESTINATION FOR A NAVIGATION SYSTEM," which application is incorporated in its entirety in this application by this reference.

BACKGROUND OF THE INVENTION

1. Field of the Invention

The present invention relates in general to a system and a method for determining a route to a destination for a navigation system, and in particular to a method and system where the system is for a vehicle having a navigation system.

2. Related Art

Navigation systems, especially navigation systems for a vehicle, help the users reach a predetermined destination, and in the case of a vehicle navigation system, helps the driver reach a destination predetermined by the driver. To avoid guiding the driver into congestion or the like, current navigation systems receive information concerning congestion via a traffic message channel (TMC). With the help of the information received from the TMC, the navigation system searches for a route circumnavigating the congestion to guide the driver of the vehicle to the predetermined destination. Nevertheless, by taking into account additional information and parameters related to a route to a destination, a route resulting in better guidance to a destination may be determined. Furthermore, a driver of the vehicle may wish to have access to scheduling and address information for setting new destinations and planning travel throughout a day, especially when using a rental car while travelling away from home.

Therefore, a need exists to provide an improved system and method for determining a route to a destination for a navigation system, a more accurate estimation of the arrival time at the destination and, to avoid congestion and delays, a navigation system providing access to scheduling and address information for the driver.

SUMMARY

A system for determining a route from the current position of a vehicle with a navigation system to a destination is provided. The system includes a navigation system for determining the route to the destination, a remote information system for providing information related to the route to the destination, and a data communication network for providing a communication link between the navigation system and the information system. The navigation system may include a destination unit for storing the destination, a communication unit providing communication to the information system via the data communication network, and a processing unit configured to request information related to the route from the remote information system via the communication unit, and to determine the optimum route to the destination based on the requested information. The remote information system may include a communication unit providing communication to the navigation system via the data communication network, a memory unit configured to store information related to a route, and a processing unit configured to receive requests for information related to a route from the navigation system, retrieve the requested information, and transmit the retrieved information to the navigation system.

A method for determining a route to a destination for a navigation system of a vehicle is also provided. According to this method, a communication connection between a navigation system and a remote information system is established. Then, a route to a destination is determined by the navigation system, where information related to the route is requested from the remote information system by the navigation system for use in determining the optimum route to the destination. According to an example of this method, the destination is set in the navigation system, the current position of the navigation system is determined by the navigation system, and a route from the current position of the navigation system and the vehicle to the destination is determined by the navigation system based on the requested information.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
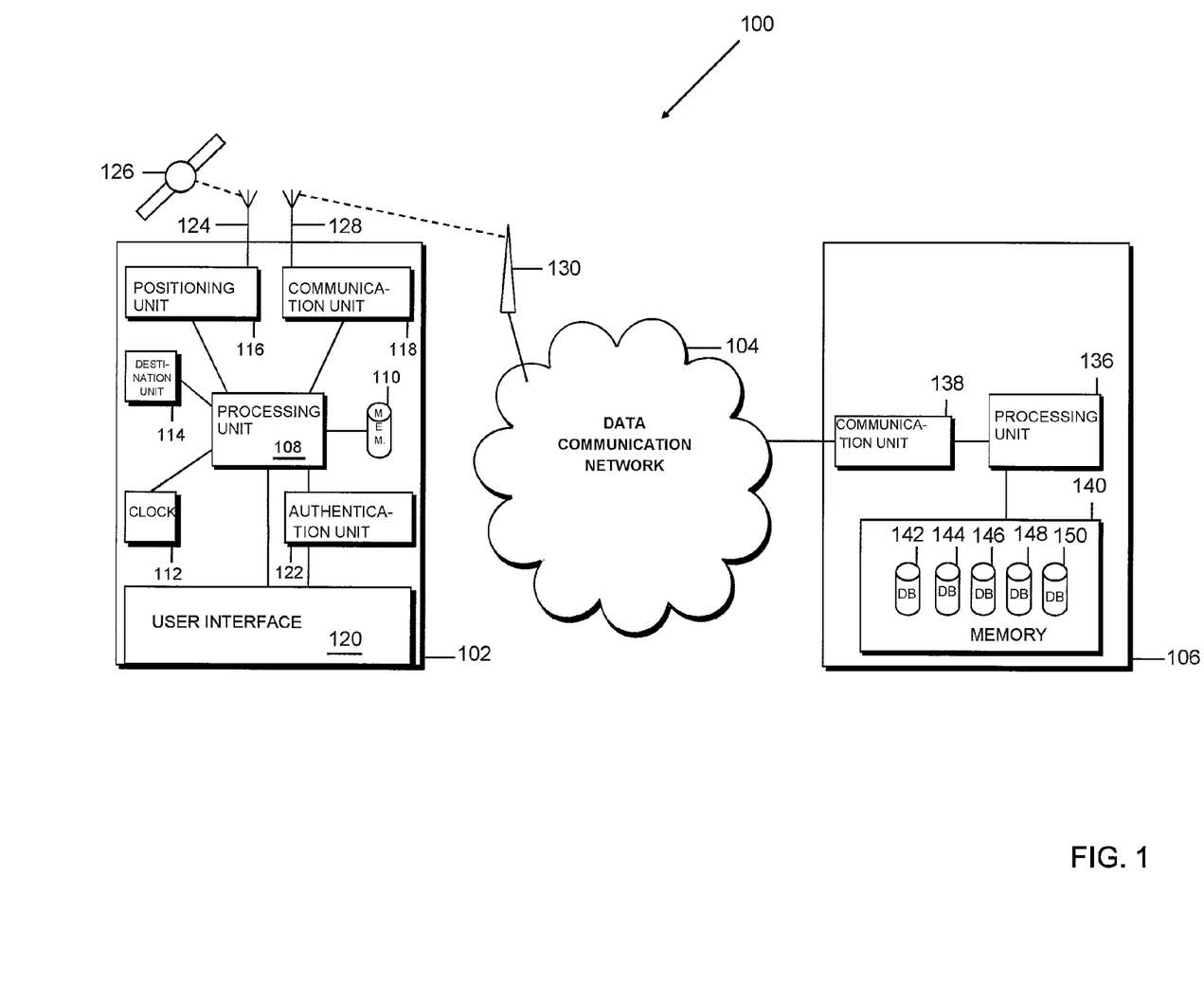
FIG. 1 shows a schematic view of a system for determining a route to a destination in accordance with the invention.

FIG. 1 shows a system 100 for determining a route to a destination including a navigation system 102, a data communication network 104, and a remote information system 106. The navigation system 102 may include a processing unit 108, a memory unit 110, a clock unit 112, a destination unit 114, a positioning unit 116, a communication unit 118, a user interface 120, and an authentication unit 122. The positioning unit 116 is connected to an antenna 124 for receiving signals from a satellite 126 to determine the current position of the navigation system 102. Satellite 126 may be part of a satellite positioning system (SPS) such as the Joint Program Office Global Positioning Position (GPS), the Russian counterpart known as Global Navigation Satellite System (GLONASS), any future Western European SPS such as the proposed "Galileo" program, or any other system providing positioning information for the positioning unit 116. Furthermore, positioning unit 116 may be adapted to determine the current position of the navigation system 102 by a terrestrial positioning system that may be based on a cellular phone system such as Global System for Mobile communications (GSM) or the like.

The communication unit 118 is connected to an antenna 128 in signal communication with a wireless access base station 130 connected to the data communication network 104. The connection between the communication unit 118 and the wireless access base station 130 may be any kind of wireless communication, for example, a communication according to the GSM or Universal Mobile Telecommunications System (UMTS) standard or any other cellular or non-cellular wireless communications, such as, for example, a wireless local area network (WLAN). The memory unit 110 of the navigation system 102 is used for storing temporary data of the processing unit 108, configuration data of the navigation system 102, and driver operating characteristics, routing information, etc., are described further below. The clock unit 112 provides the processing unit 108 with current time and date information. The destination unit 114 is used for storing a destination of a route or a sequence of destinations of a route to be reached consecutively and may be also part of the memory unit 110. The user interface 120 may include several input and output means to provide communication between the user of the navigation system 102 and the navigation system 102. Therefore, the user interface 120 may include several buttons and switches, a display that may include additionally a touch-sensitive surface, and acoustic input and output devices, such as, for example, a loudspeaker for outputting synthesized speech from the processing unit 108 and a microphone for inputting speech commands to be processed by the processing unit 108. Furthermore, the user interface 120 may include input means for authenticating a user in connection with the authentication unit 122. Thus, the user interface 120 may include a fingerprint sensor for authentication via a fingerprint, a radio-frequency identification (RFID) reader for authentication via an RFID chip of the user or any other authentication means known in the art.

The data communication network 104 provides a communication link between the remote information system 106 and the navigation system 102. As the navigation system 102 may be a mobile device, a wireless communication connection between the data communication network 104 and the navigation system 102 may be provided via a base station 130. The remote information system 106 may be connected to the data communication network 104 via a wireless or a wired connection. The data communication network 104 may itself include several communication networks known in the art, such as, for example, the Internet, a telephone communication network (i.e., the plain old telephone system (POTS)), cellular wireless networks such as GSM or UMTS, and WLANs.

The remote information system 106 may include a processing unit 136, a communication unit 138, and a memory unit 140. The memory unit 140 may include one or more databases, such as, for example, database 142 for storing traffic information (e.g., congestion or construction sites along a route, traffic advisories and weather forecasts), database 144 for scheduling information related to one or more users of the navigation system 102, database 146 for address information (which may be related to the scheduling information in database 144), database 148 for information concerning driver operating characteristics of the user of the navigation system 102, and database 150 for image information of destinations and points of interest. Although in FIG. 1 the information databases 142 through 150 are shown as being located within one memory unit 140, these information databases 142 through 150 may be distributed over several other information systems (not shown) and the processing unit 136 and the communication unit 138 may be configured to communicate and cooperate with these other information systems connected to the data communication network 104 for providing data from information databases 142-150 in response to a request from the navigation system 102.

Prior to entering a vehicle equipped with a navigation system 102, a user of the navigation system 102 may enter appointment information into a scheduling database of, for example, a personal computer (PC) or a personal digital assistant (PDA), which is then synchronized with a scheduling database 144 of the remote information system 106 for providing scheduling information to the user any time and anywhere, for example, in the office, at home, in a hotel, or on a mobile device during travelling.

Figure 2:
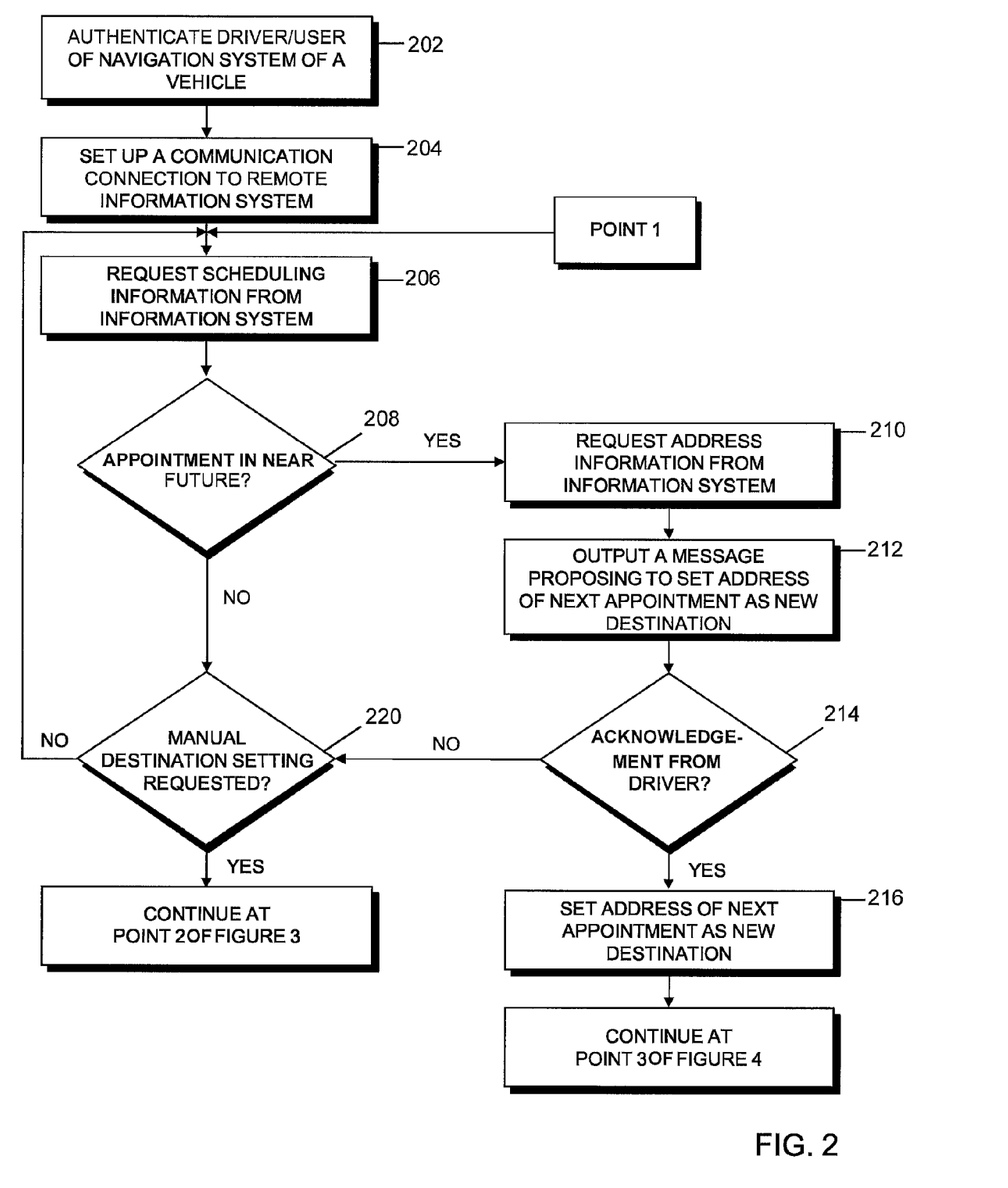
FIG. 2 shows a flowchart depicting the steps of an example of a method of determining a route to a destination in accordance with the invention.
Figure 3:
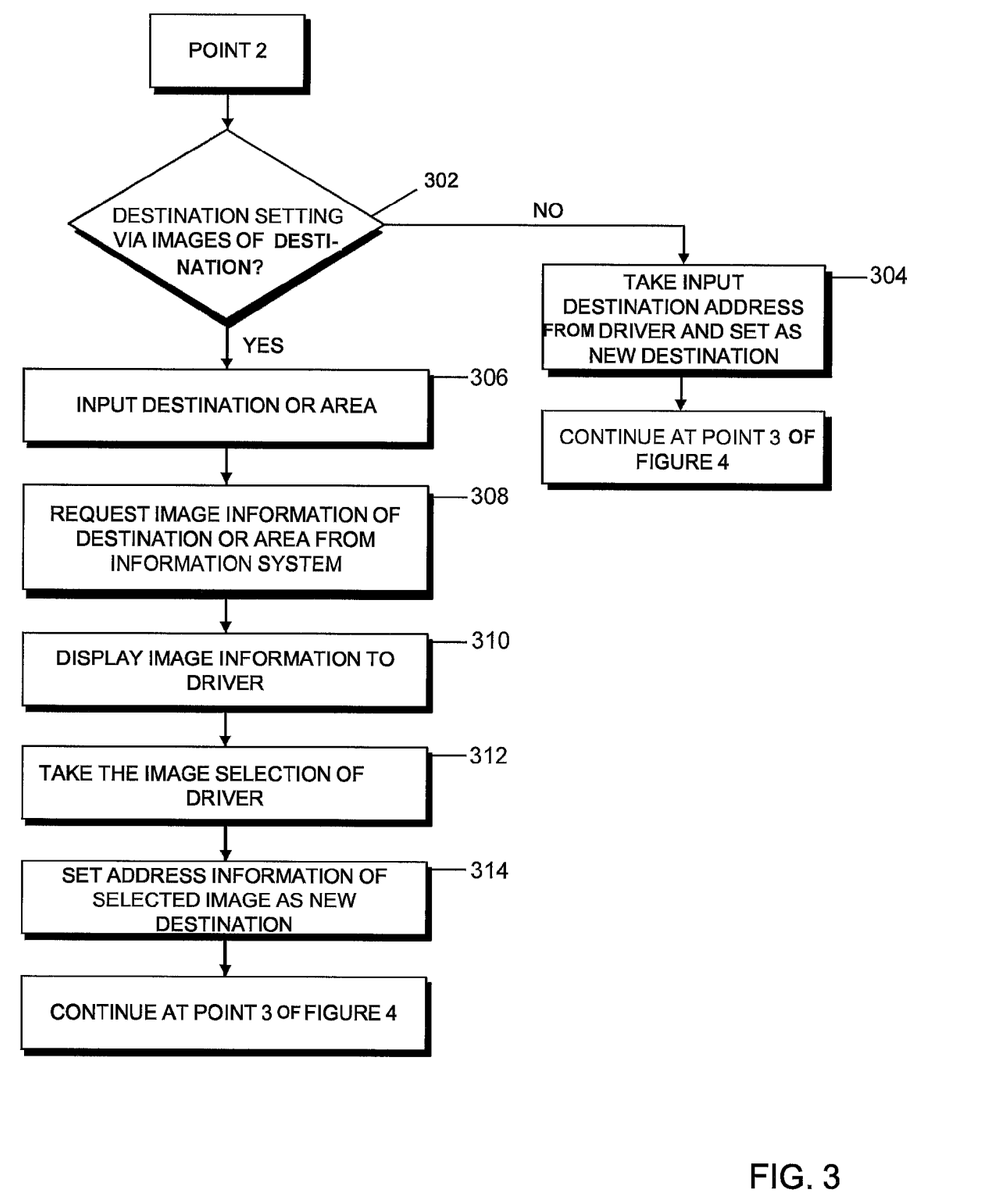
FIG. 3 shows another flowchart depicting additional steps of the example of a method of determining a route to a destination in accordance with the invention shown in FIG. 2.
Figure 4:
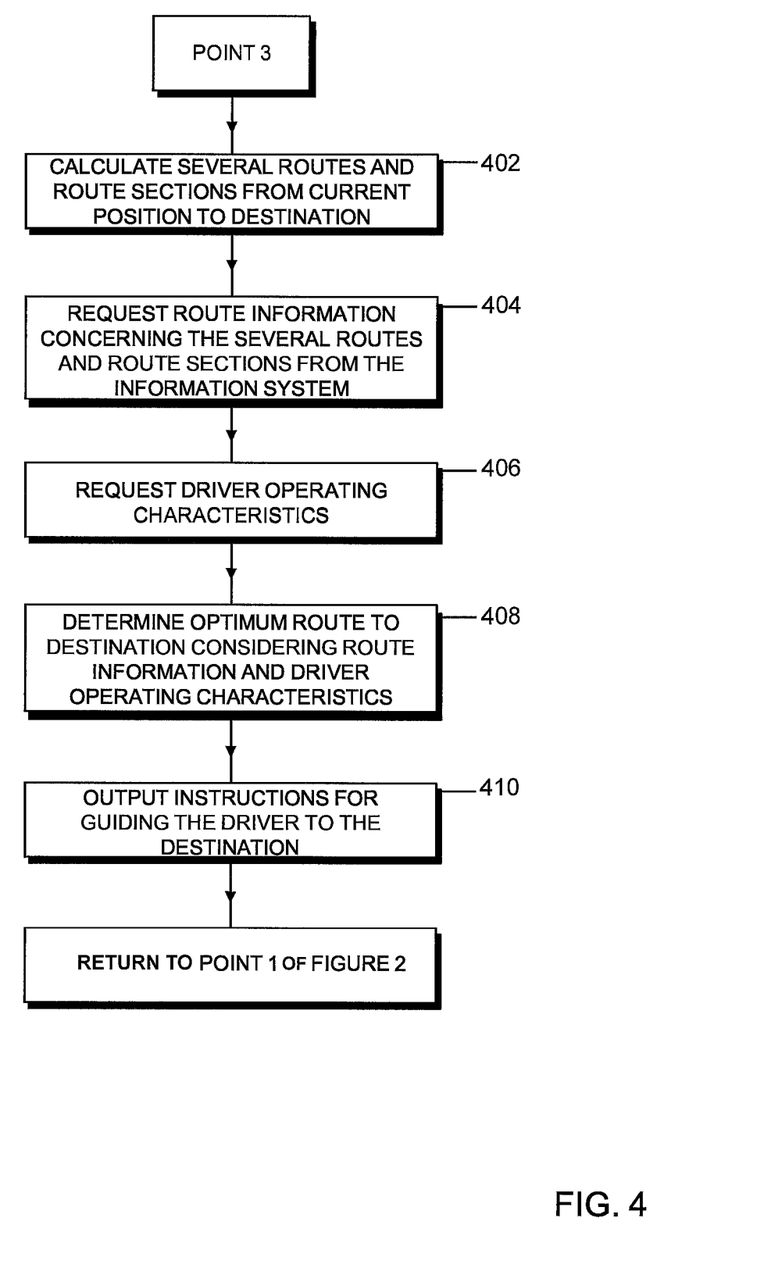
FIG. 4 shows yet another flowchart depicting additional steps of the example of a method for determining a route to a destination in accordance with the invention shown in FIGS. 2 and 3.

FIGS. 2, 3, and 4 show flowcharts depicting the steps of an example of a method of determining a route to a destination for a vehicle in accordance with the invention. Turning to FIG. 2, when the user gets into a vehicle equipped with the navigation system 102 (FIG. 1) user identification and authorization (step 202) is performed by means of the user interface 120 and the authentication unit 122 of the navigation system 102. Next, in step 204, the navigation system 102 sets up a communication connection to the remote information system 106 via the data communication network 104. After user authentication, the navigation system 102 may request scheduling information of the user from database 144 of the information system 104 (step 206). When an appointment within the near future is found in the scheduling information in decision step 208, the navigation system 102 retrieves (in step 210) address information relating to the next appointment from database 146 of the information system 106 and proposes (in step 212) to set the found address as the destination for the navigation system 102 by displaying an appropriate text message on the user interface 120 or by outputting a corresponding audio message via loudspeakers connected to the navigation system 102. If in decision step 214 the user acknowledges and accepts setting the address information of the next appointment as the destination, the navigation system 102 sets the address information as the destination in the destination unit 114 in step 216. The process then proceeds to point 3 of FIG. 4. If an acknowledgement is not received in decision step 214, the process proceeds to decision step 220.

Alternatively, if, in decision step 208, an appointment in the near future is not found, the process proceeds to decision step 220, where the user may input a destination directly via the user interface 120, in which case the process proceeds to point 2 of FIG. 3. If the user elects not to manually set a destination, the process returns to point 1 of FIG. 2.

Turning to point 2 of FIG. 3, in decision step 302, the user may request setting a destination after reviewing image data related to various predetermined destinations or points of interest (such as, for example, buildings, hotels, or restaurants, all of which may be within a predetermined distance), in which case the process proceeds to step 306. If the user elects not to choose this option, in step 304 the user may input a destination directly by entering a destination address via the user interface 120 that is then set in the destination unit 114 and the process proceeds to point 3 of FIG. 4.

If, in decision step 302, the user requests images of destinations or points of interest, in step 306, the user may input information related to a specific destination, area, or point of interest, including a maximum distance to a destination. Upon this request being made, in step 308 the processing unit 108 requests image data from database 150 of the remote information system 106 responsive to the input information, if any, provided by the user. In step 310, the processing unit 108 displays the received image data on the display of the user interface 120. The user may then browse through the images and may select (in step 312) one of the images as a new destination. If a new destination is selected, the address information of the image is set in step 314 as the new destination in the destination unit 114, and the process proceeds to point 3 of FIG. 4.

Turning to FIG. 4, after a destination has been set in the destination unit 114, in step 402 the processing unit 108 determines the route from the current position that is determined by the positioning unit 116 to the set destination. In determining the route from the current position to the set destination, the processing unit 108 in step 404 may request route information from database 142 of the remote information system 106 related to any routes or route sections from the current position to the set destination that may be considered in determining the optimum route from the current position to the set destination. This route information includes not only the current traffic situation on the various sections of the route(s), but may also include information about any construction sites along a route that may cause a delay as well as traffic forecasts for each section of a route for the estimated time the user will drive along these sections of the route. Traffic forecasts may be based on historical traffic information collected in the past indicating possible congestion due to rush hours or may be based on special event information, for example, the beginning or ending of a concert or a sports event that may cause a dramatic increase in traffic. Moreover, the route information of the remote information system 106 may additionally include a weather forecast for several sections of the route for the estimated time the user will drive along these route sections. The weather forecast information may be used in the navigation system 102 to avoid planning a route using route sections where snow, ice, or heavy rain is expected.

Additionally, the navigation system 102 may request (in step 406) information about the driving habits or operating characteristics of the user, which may include, for example, how fast the driver intends to drive on different kinds of roads, such as motorways, city roads, depending on dry and wet road surfaces, and how often the driver wishes to take breaks during long travels. These driving habits may be stored in database 146 of the remote information system 104 and thus are also available to the processing unit 108 of the navigation system 102 to be taken into account when calculating an optimum route to the set destination.

After all the information concerning the route to the set destination and the driver are collected and processed, in step 408 the processing unit 108 finally determines the optimum route to the set destination. Via a voice guide and/or a visual guide of the user interface 120, the driver of the vehicle may be instructed (in step 410) to drive along the determined route to the destination, as known in the art.

Moreover, if the destination was set due to an appointment retrieved from the scheduling database 144, the processing unit 108 may estimate the arrival time at the destination and compare the estimated arrival time with the starting time of the appointment at the destination. In case the appointment cannot be reached by the starting time, contact information relating to a participant of the appointment is retrieved on request of the processing unit 108 of the navigation system 102 by the processing unit 136 of the remote information system 106 from the scheduling database 144 and the address database 146. In this case, the processing unit 108 of the navigation system 102 may inform the user that the destination cannot be reached within the desired time and offer to automatically negotiate for the user a new starting time for the appointment by adapting the scheduling information of the user from database 146 and the other participants in the appointment or to contact a participant in the appointment by placing a telephone call. In case of a change of the starting time of the appointment, a new process of destination setting may be necessary and may be initiated as described above.

Additionally or alternatively, the communication unit 118 of the navigation system 102 may be configured to establish a data communication connection to a scheduling database of a person related to or connected with the next appointment and if the estimated arrival time is past the starting time of the next appointment, the processing unit 108 of the navigation system 102 may negotiate a new starting time of the appointment and adjust the scheduling information in accordance with the negotiation. This feature of the system make be automatically initiated, thus allowing a user of the navigation system to reschedule appointments that cannot be timely reached during travelling without intervention from the user.

While travelling along a route, the processing unit 108 may monitor the traffic situation as well as the behaviour of the driver. Monitoring the traffic situation may include the processing unit 108 measuring the driving speed of the vehicle and comparing this driving speed with an expected driving speed for this particular route. Furthermore, the current driving speed may be transferred via the communication unit 118 and the data communication network 104 to the remote information system 106. The remote information system 106 may be configured to estimate from data received from several vehicles driving along the same road the current traffic situation. For example, if all the vehicles are driving much slower than expected for this type of road, congestion or a road overload can be assumed. This information may then be stored together with time information as historical traffic information that can be taken into account by the navigation system 102 in future route calculations. The result of such analysis for weeks or months may be, as an example, that on a specific road every Thursday afternoon between 2 and 4 o'clock, the traffic load is very high. With this information, the navigation system 102 can either try to circumnavigate this road when searching for a route to a destination or inform the user about this potential problem and calculate a corresponding delayed arrival time.

Monitoring driving habits or driver operating characteristics may also include the monitoring of the driving speed on certain kinds of roads and certain road conditions, such as, for example, dry or wet road surfaces or driving by day or by night. Furthermore, as stated above, the break intervals of the driver during long travels may be monitored and evaluated as additional driver operating characteristics. By use of these driver operating characteristics the processing unit 108 of the navigation system 102 is able to find the optimum route to a destination that is adapted to these specific driver operating characteristics. By taking into account the driver operational characteristics, an estimated arrival time can be more precisely calculated by the processing unit 108.

Furthermore, the route the driver is driving may be recorded together with time and date or day of the week information as additional driving habits information. When no destination is set in the destination unit 114, the processing unit 108 may analyze the route the driver is currently driving and try to match this route with routes that are stored in the driving habits information by taking into account not only the route but also the time of the day and the day of the week. If a match is found, for example, when a driver usually leaves the office at 6 p.m. on every Friday and drives to a golf club, the processing unit 108 may assume that the golf club is the destination and automatically calculate the optimum route to the destination taking into account the route information as described above. In case road congestion or a construction site is on the route the driver usually takes to the golf club, the navigation system 102 may automatically circumnavigate the driver to the golf club avoiding using the road with the congestion or the construction site.

The driver operational characteristics may also include vehicle settings, such as, for example, a seat position, heating and air conditioning settings, and preferred radio stations. In case the vehicle is used by several drivers or a car rental vehicle is used by the driver, this information is may be made available to the navigation system 102 after driver authentication and may be forwarded from the navigation system 102 to a control unit in the vehicle that controls the seat positioning, the heating and air conditioning settings, the radio settings, and other similar driver operational characteristics.

In another implementation, the request for information and the information response between the navigation system 102 and the remote information system 106 may be coded according to a predetermined protocol. These predetermined protocols may include a short message service (SMS), a multimedia messaging service (MMS), an e-mail that may include special keywords, or a file containing data coded in an extensible mark up language (XML-file). The utilization of protocols such as these enables a reliable and fast communication between the navigation system 102 and the information system 106 via various data communication networks providing different communication platforms and bandwidths, such as, for example, desktop software such as Microsoft Outlook, internet software on an internet site, or portal or personal information manager software on a mobile device.

The remote information system 106 may include a server in a data communication network 104 and the navigation system 102 may be adapted to connect to the data communication network 104 via a wireless transmission. By arranging the remote information system as a server in a data communication network 104, a data exchange between the navigation system 102 and the remote information system 106 as well as communication between a PDA or a PC of the user and the remote information system 106 can be easily accomplished. This ensures that the information on the remote information system 106 concerning scheduling information and traffic information may be always kept up to date.

It will be understood, and is appreciated by persons skilled in the art, that one or more processes, sub-processes, or process steps described in connection with FIGS. 2-4 may be performed by hardware and/or software. If the process is performed by software, the software may reside in software memory (not shown) in a suitable electronic processing component or system such as, one or more of the functional components or modules schematically depicted in FIGS. 1-4. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed invention to the precise form disclosed. Modifications and variations are possible in light of the above description or may be acquired from practicing the invention. The claims and their equivalents define the scope of the invention.

What is claimed is:

1. A method of determining an optimal route from a current position of a vehicle to a destination for a navigation system of the vehicle, the method comprising the steps of:
   identifying a user of the navigation system where the navigation system is controlled by a processor;
   authenticating the user to the navigation system;
   connecting the navigation system and a remote information system;
   if the user is authenticated to the navigation system, requesting scheduling information of the user from the remote information system;
   determining a next appointment based on the current time and date and the scheduling information;
   requesting address information of the next appointment from the information system, where the next appointment is a previously scheduled appointment;
   requesting information related to one or more possible routes from the remote information system in response to receipt of the address information;
   setting the destination in the navigation system based on the address information of the next appointment; and
   determining an optimal route to the destination from the one or more possible routes, where the optimal route is selected based on received information from the remote information system and the current position.

2. The method of claim 1, where the step of connecting is initiated by the navigation system and where the step of requesting information from the remote information system comprises sending a request from the navigation system to the remote information system.

3. The method of claim 1, further comprising the steps of:
   setting the destination in the navigation system; and
   determining the current position of the navigation system by the navigation system.

4. The method of claim 3, further comprising the step of requesting an acknowledgement from a user of the navigation system of the setting of the destination.

5. The method of claim 1, further comprising the steps of:
   determining an estimated arrival time at the destination;
   comparing the estimated arrival time with a starting time of the next appointment; and if the estimated arrival time is after the starting time of the next appointment, establishing a communication connection to a contact person for the next appointment.

6. The method of claim 5, where establishing a communication connection to the contact person comprises placing a telephone call to the contact person utilizing a communication of the navigation system.

7. The method of claim 5, where establishing a communication connection to the contact person comprises:
establishing a data communication connection to a scheduling database of the contact person;
automatically negotiating a new starting time of the next appointment; and
updating the scheduling information of the user in accordance to the negotiation.

8. The method of claim 1, where the information provided from the remote information system related to the route comprises at least one of the group consisting of:
current traffic situations along the route;
construction sites along the route;
traffic forecasts for the estimated time during which the route will be driven; and
weather forecasts for the estimated time during which the route will be driven.

9. The method of claim 8, where the traffic forecasts are based on at least one of:
historical traffic information relating to the route; and
event information relating to the route, the event information comprising concert events, cultural events, and sporting events.

10. The method of claim 1, where determining the optimum route is further based on driver operating characteristics.

11. The method of claim 10, where the driver operating characteristics are requested by the navigation system from the remote information system.

12. The method of claim 11, further comprising:
collecting information related to the driver operating characteristics during driving;
storing the collected driver operating characteristics in a memory of the navigation system; and
storing the driver operating characteristics in a memory of the remote information system.

13. The method of claim 10, where the driver operating characteristics are stored in a memory of the navigation system.

14. The method of claim 1, further comprising the steps of:
collecting current traffic situations during driving; and
storing the collected current traffic situations in a memory of the navigation system; and
storing the current traffic situations in a memory of the remote information system.

15. The method of claim 1, further comprising the steps of:
requesting image data of destinations and points-of-interest from the remote information system;
displaying the image data to a user of the navigation system, where the user is enabled to selecting one or more images from the image data.

16. A system for calculating an optimum route from a current position of a vehicle to a selected destination, the system comprising:
a navigation system located in the vehicle;
a remote information system containing information related to one or more routes to the selected destination;
a data communication network providing a communication link between the navigation system and the remote information system; and
a processing unit configured to request information related to the one or more routes from the remote information system and to determine an optimum route to a destination based on the requested information and the current position, where the processing unit of the navigation system is configured to request scheduling information of the user from the remote information system, to determine a next appointment based on the current time and date and the scheduling information, to request address information of the next appointment from the remote information system, and to set the destination in the destination unit of the navigation system based on the address information of the next appointment, where the next appointment is a previously scheduled appointment.

17. The system of claim 16, where the navigation system comprises:
a destination unit for storing one or more selected destinations; and
a communication unit configured to provide communication to the remote information system via the data communication network.

18. The system of claim 17, where the remote information system comprises:
a communication unit configured to provide a communication link to the navigation system via the data communication network;
a memory unit for storing information related to the one or more routes; and
a processing unit configured to receive a request for information related to the one or more routes from the navigation system, to retrieve information related to the one or more routes in response to the request, and to transmit the retrieved information to the navigation system.

19. The system of claim 18, where the memory unit of the remote information system comprises a database for the storage of traffic information related to routes to destinations.

20. The system of claim 19, where the traffic information stored in the database includes current traffic situations along the route, construction sites along the route, traffic forecasts for the estimated time during which a route may be driven, and weather forecasts for the estimated time during which a route may be driven.

21. The system of claim 19, where the memory unit of the remote information system further comprises a database for the storage of scheduling information related to one or more users of the navigation system.

22. The system of claim 21, where the memory unit of the remote information system further comprises a database for the storage of address information.

23. The system of claim 22, where the memory unit of the remote information system further comprises a database for the storage of driver operating characteristics.

24. The system of claim 23, where the processing unit of the navigation system is further configured to collect information concerning driver operating characteristics during driving, and to store the collected driver operating characteristics in the database of the memory unit for the storage of driver operating characteristics.

25. The system of claim 23, where the memory unit of the remote information system further comprises a database for the storage of image data related to destinations and points-of-interest.

26. The system of claim 25, where the processing unit of the navigation system is further configured to request from the remote information system image data from the database of the memory unit, to present the image data to a user of the navigation system via the user interface of the navigation system, and to set a destination in the destination unit of the navigation system responsive to the user's selection input one or more images from the image data.

27. The system of claim 17, where the processing unit of the navigation system is configured to initiate establishing a communication link to the remote information system and is further configured to send a request for information related to the one or more routes to the remote information system.

28. The system of claim 17, where the navigation system further comprises a positioning unit configured to determine the current position of the navigation system.

29. The system of claim 28, where the navigation system further comprises an authentication unit configured to identify a user of the navigation system and authenticate the user to the navigation system.

30. The system of claim 29, where the communication unit of the navigation system is further configured to place a telephone call to a contact person related for the next appointment, and the processing unit of the navigation system is further configured to determine an estimated arrival time at the destination, to compare the estimated arrival time with a starting time of the next appointment, and if the estimated arrival time is after the starting time of the next appointment, to place a telephone call to the contact person related for the next appointment.

31. The system of claim 17, where the navigation system further comprises a user interface providing communication between a user of the navigation system and the processing unit of the navigation system.

* * * * *